(12) United States Patent
Rotgans et al.

(10) Patent No.: US 12,045,443 B2
(45) Date of Patent: Jul. 23, 2024

(54) DATA FILTERING DEVICE

(71) Applicant: KONINKLIJKE PHILIPS N.V., Eindhoven (NL)

(72) Inventors: Niels Roman Rotgans, Cambridge, MA (US); Niels Laute, Venlo (NL); Lucas Jacobus Franciscus Geurts, Sterksel (NL)

(73) Assignee: Koninklijke Philips N.V., Eindhoven (NL)

( * ) Notice: Subject to any disclaimer, the term of this patent is extended or adjusted under 35 U.S.C. 154(b) by 313 days.

(21) Appl. No.: 17/283,368

(22) PCT Filed: Nov. 18, 2019

(86) PCT No.: PCT/EP2019/081564
§ 371 (c)(1),
(2) Date: Apr. 7, 2021

(87) PCT Pub. No.: WO2020/104342
PCT Pub. Date: May 28, 2020

(65) Prior Publication Data
US 2022/0004297 A1    Jan. 6, 2022

(30) Foreign Application Priority Data
Nov. 22, 2018   (EP) .................................. 18207753

(51) Int. Cl.
| | | |
|---|---|---|
| G06F 16/245 | (2019.01) | |
| G06F 3/0484 | (2022.01) | |
| G06F 3/04845 | (2022.01) | |
| G06F 9/451 | (2018.01) | |
| G06F 16/248 | (2019.01) | |

(52) U.S. Cl.
CPC ........ G06F 3/0484 (2013.01); G06F 3/04845 (2013.01); G06F 9/451 (2018.02); G06F 16/245 (2019.01); G06F 16/248 (2019.01); G06F 2203/04803 (2013.01)

(58) Field of Classification Search
None
See application file for complete search history.

(56) References Cited

U.S. PATENT DOCUMENTS

| | | | | |
|---|---|---|---|---|
| 6,097,384 A | * | 8/2000 | Alecci | .................. G06F 3/0481 715/767 |
| 9,495,080 B2 | | 11/2016 | Mockli | |
| 10,037,364 B1 | | 7/2018 | Cassidy | |
| 11,460,974 B1 | * | 10/2022 | Murray | ............... G06F 3/04842 |
| 2003/0169293 A1 | | 9/2003 | Savage | |

(Continued)

FOREIGN PATENT DOCUMENTS

JP    2009116471 A    5/2009

OTHER PUBLICATIONS

International Search Report for PCT/EP2019/081564 filed Nov. 18, 2019.

*Primary Examiner* — Yu Zhao

(57) ABSTRACT

Some embodiments are directed to a data filtering device configured to select for a widget of visualizing type out of multiple widgets, the controlling widgets of filtering type, wherein a widget is controlling according to a control rule, said control rule depending on the widget location of the widget of visualization type and the widget location of the widget of filtering type.

13 Claims, 13 Drawing Sheets

(56) References Cited

U.S. PATENT DOCUMENTS

| | | | |
|---|---|---|---|
| 2004/0128353 A1* | 7/2004 | Goodman | H04L 63/104 709/204 |
| 2011/0022958 A1 | 1/2011 | Han | |
| 2013/0103648 A1* | 4/2013 | Sample | G06T 17/05 707/661 |
| 2014/0082155 A1* | 3/2014 | Abrams | G06F 16/24578 709/220 |
| 2014/0108936 A1* | 4/2014 | Khosropour | H04L 41/0803 715/735 |
| 2014/0365511 A1* | 12/2014 | Burrows | G06F 16/288 707/754 |
| 2014/0380219 A1* | 12/2014 | Cartan | G06F 3/0484 715/771 |
| 2015/0113452 A1 | 4/2015 | Haraszti | |
| 2015/0128089 A1 | 5/2015 | Johnson | |
| 2015/0186476 A1 | 7/2015 | Nishino | |
| 2016/0224232 A1 | 8/2016 | Pourshahid | |
| 2016/0246490 A1* | 8/2016 | Cabral | G06F 9/451 |
| 2017/0364243 A1 | 12/2017 | Regnier | |

* cited by examiner

| | 231 | 232 | 233 | 234 |
|---|---|---|---|---|
| 211 | 0 | 0 | 20 | 10 |
| 212 | 10 | 10 | 20 | 15 |
| 213 | 10 | 15 | 20 | 20 |
| 214 | 10 | 20 | 20 | 30 |
| 215 | 0 | 10 | 10 | 15 |
| 216 | 0 | 15 | 10 | 25 |

↘ Risk-adjusted outcomes Q3 - Q4 2014

| Outcomes ──────────────────────────────────────▶ |

| Mortality | Length of stay | Readmission | Complications |
|---|---|---|---|
| Gynecology surgical | Cardiology interventional | Perc cardiovasc proc W Drug-eluting stent W/O MCC | Thoracic surgery |
| -0.8% ⊕ | -0.8% ⊕ | -0.8% ⊕ | -0.8% ⊕ |

FIG. 6c

DATA FILTERING DEVICE

CROSS-REFERENCE TO PRIOR APPLICATIONS

This application is the U.S. National Phase application under 35 U.S.C. § 371 of International Application No. PCT/EP2019/081564, filed on Nov. 18, 2019, which claims the benefit of European Patent Application No. 18207753.7, filed on Nov. 22, 2018. These applications are hereby incorporated by reference herein.

FIELD OF THE INVENTION

The invention relates to a data filtering device, a data filtering method, and a computer readable medium.

BACKGROUND OF THE INVENTION

Traditional dashboards, e.g., data displays, typically interactive data displays, are constructed using components that visualize data. Such components are known as widgets. Each widget has access to a section of the data. A widget can render the data in various ways, e.g., with visuals or data tables. A dashboard may or may not be interactive.

Current dashboards can be interactive in various ways. For example, there may be widgets with which a user can interact and which then act as filters. Such filtering widgets operate as global filters. For example, a user may use a filtering widget to set a time range, indicating the data which is to be visualized by the visualizing widgets.

When analyzing large data sets, there are several problems with existing dashboard technology. For example, filtering widgets act globally on the entire data display. With existing technology it is time consuming or even impossible to make complicated filtering arrangements. With the growth of data sets, and the importance of data analysis these short comings are increasingly felt. A technical device which provides an improved way of filtering data for data displays is desired.

SUMMARY OF THE INVENTION

It would be desirous to have an improved data filtering device in which means are configured so that filtering of the data is improved. An improved data filtering device is presented. The data filtering device comprises
- a data interface configured to retrieve data from a database,
- a memory configured to store multiple widget codes corresponding to multiple widgets, a widget code comprising a widget location indicating a display region for displaying the corresponding widget on a display, a widget of filtering type having widget code to obtain a filtering parameter, a widget of visualization type having widget code configured to visualize data on the display, and
- a processor configured to render the multiple widgets on the display, the rendering comprising for a widget of visualization type,
  - selecting from the multiple widgets, the controlling widgets of filtering type, wherein a widget is controlling according to a control rule, said control rule depending on the widget location of the widget of visualization type and the widget location of the widget of filtering type,
  - obtaining data from the database filtered according to the filtering parameter of the selected controlling widgets,
  - visualizing the filtered data according to the widget code of the widget of visualization type.

The data filtering method uses filtering widgets to filter the data visualized by the visualization widgets. For example, a visualization widget may be a line graph, bar graph, pie graph, etc. For example, a filtering widget may filter on, e.g., one or more properties of the data, e.g., that the record has data in a particular interval, etc. Interestingly, a control rule determines whether or not a particular filtering widget affects a particular visualization widget, based on the location of these widgets. Various control rules have been tried and are described herein. As a result the data filtering device provides quick feedback to a user to inform him on the internal state of the machine, e.g., how the data is filtered. Moreover, a single filter may affect multiple visualization widget if the control rule so determines. This means that less screen space is needed, yet an efficient transfer of the machine state to the user is still effected. The user may use this information to change the way the data is filtered by changing the location of the widgets.

For example, the multiple widgets may comprise a first widget of visualization type, a second widget of visualization type, and a third widget of filtering type. The control rule depending on the widget location of the third widget allows selectively arranging the third widget to be a controlling widget for the first widget but not the second widget, or a controlling widget for the second widget but not the first widget.

Thus by changing the location of a filtering widget, the filtering of data in visualization widgets is changed. Note that the reverse is also possible; changing filtering of data in a visualization widget by changing the location of the visualization widget with respect to one or more filtering widgets.

The data filtering device is an electronic device. For example, the data filtering device may be a computer. The computer may be connected to a display to display to data display. The data filtering device may be implemented in various other electronic devices, e.g., a television, a set-top box, mobile phone, etc.

The data filtering device and method described herein may be applied in a wide range of practical applications. Such practical applications include analysis of data of all kinds, e.g., hospitalization data, financial data, data from manufacturing plants, etc.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIGS. 1a-1b schematically shows an example of an embodiment of a data filtering device, FIG. 2 schematically shows an example of an embodiment of a data display, FIG. 3a schematically shows an example of an embodiment of a visualization widget code, FIG. 3b schematically shows an example of an embodiment of a filtering widget code, FIG. 4a schematically shows an example of an embodiment of a data display, FIG. 4b schematically shows an example of an embodiment of a data display, FIG. 5a schematically shows an example of a tree data structure, FIG. 5b schematically shows an example of a widget table, FIGS. 6a-6e show screenshots of an embodiment of a data filtering device, FIG. 7 schematically shows an example of an embodiment of a method of filtering data, FIG. 8a schematically shows a computer readable medium having a writable part comprising a computer program according to an embodiment, FIG. 8b schematically shows a representation of a processor system according to an embodiment.

Figure 1A:
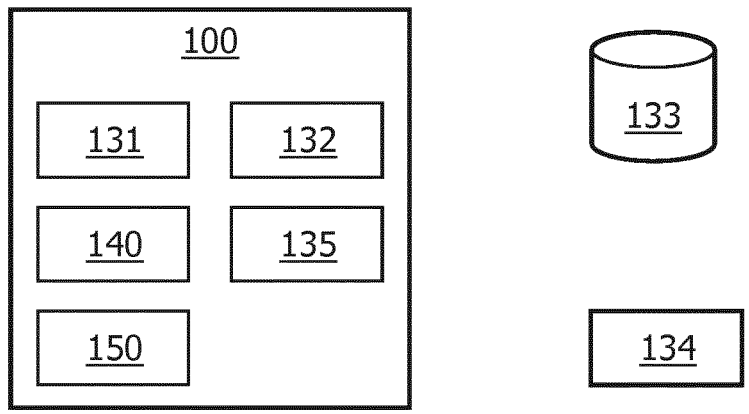

LIST OF REFERENCE NUMERALS IN FIGS. 1A-5B 100 a data filtering device
131 a data interface
132 a display interface
133 a database
134 a display
135 a user input interface
140 a memory
150 a processor
141-142 a widget code
160 a rendering unit
161 an iterator
162 a selector
163 a data obtaining unit
164 a visualization unit
165 a further rendering part
170 an input unit
201 a y-axis
202 an x-axis
210 a data display
211, 214, 216 a visualization widget
212, 213, 215 a filtering widget
241 a visualization widget code
242, 252 a widget location
243, 253 rendering data
244, 254 executable code 245 a data binding
251 a filtering widget code
255 a filter parameter
F1-F6 a filtering widget
V1-V4 a visualization widget
221-226 a widget indication
231 a top-left X-coordinate
232 a top-left Y-coordinate
233 a bottom-right X-coordinate
234 a bottom-right Y-coordinate
1000 a computer readable medium
1010 a writable part
1020 a computer program
1100 a device
1110 a system bus
1120 a processor
1130 a memory
1140 a user interface
1150 a communication interface
1160 a storage
1161 an operating system
1162, 1163, 1164 instructions

DETAILED DESCRIPTION OF EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1a schematically shows an example of an embodiment of a data filtering device 100, a database 133 and a display 134. Database 133 may be external to data filtering device 100 or internal to data filtering device 100. In any case, database 133 may be accessed through a data interface 131. Display 134 may be external to data filtering device 100 or internal to data filtering device 100. In any case, display 134 may be accessed through a display interface 132. Data filtering device 100 may be configured to obtain data from database 133, to process data, and to display a visualization on a display, e.g., display 134. The data may be digital data.

Data filtering device 100 may comprise a user input interface 135. For example, the user input interface 135 may comprise a touch screen, a mouse, etc. For example, the user input interface 135 may comprise a keyboard. A user of data filtering device may use the user input interface 135 to change the data display. If the data display is not interactive, then the user input interface 135 is optional.

The data interface may comprise a connector, e.g., a wired connector, e.g., an Ethernet connector, an optical connector, etc., or a wireless connector, e.g., an antenna, e.g., a Wi-Fi, 4G or 5G antenna. For example, the display interface may comprise a display connector, e.g., a HDMI, DisplayPort, or the like. The data interface and/or display interface may comprise a memory access port, a bus, and the like.

Data filtering device 100 further comprises a memory 140 and a processor 150. Memory 140 may be configured to store computer code, including widget code, for execution by processor 150. For example, computer code may comprise low level computer code, e.g., machine instructions. For example, computer code may comprise high-level computer code, e.g., rendering parameters. High-level computer code may be executed by corresponding execution code. The latter may be implemented in lower-level code than the high-level code. Memory 140 may be an electronic memory. Processor 150 may be an electronic processor, e.g., one or more processor circuits, e.g., microprocessors, etc.

For example, rendering unit 160 may comprise common code which may be used to render all of the multiple widgets, e.g., depending on the rendering parameters and the like in the widget. The widget may extend the common code with executable code specific to the widget.

Figure 1B:
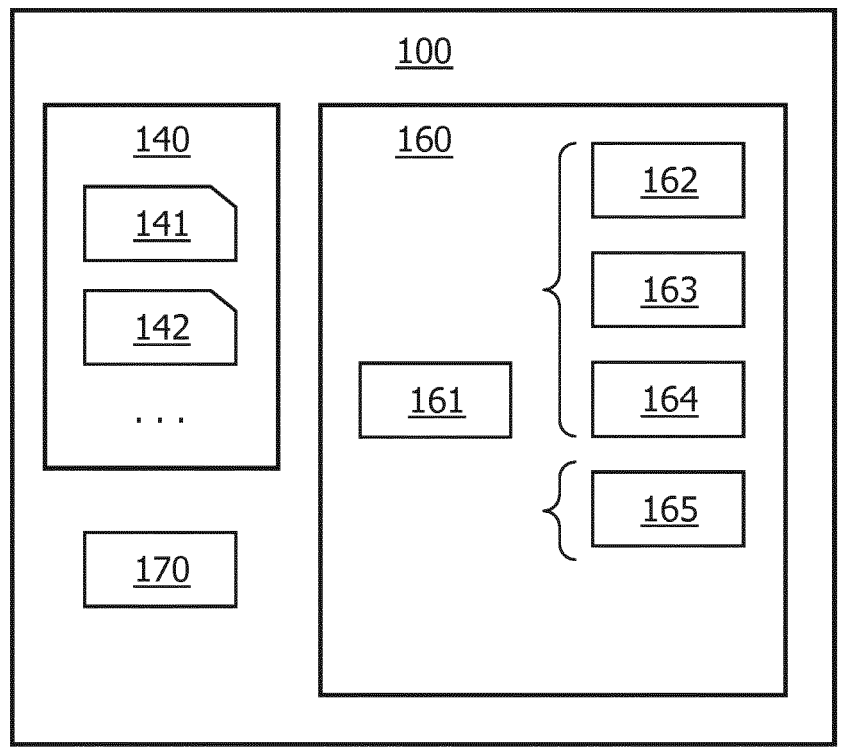

The execution of data filtering device 100 is implemented in a processor circuit, examples of which are shown herein. FIG. 1*b* shows functional units that may be functional units of the processor circuit. For example, FIG. 1*b* may be used as a blueprint of a possible functional organization of the processor circuit. The processor circuit is not shown separate from the units in FIG. 1*b*. For example, the functional units shown in FIG. 1*b* may be wholly or partially implemented in computer instructions that are stored at device 100, e.g., in an electronic memory of device 100, and are executable by a microprocessor of device 100. In hybrid embodiments, functional units are implemented partially in hardware, e.g., as coprocessors, e.g., graphical coprocessors, and partially in software stored and executed on device 100.

FIG. 1*b* schematically shows an example of an embodiment of a data filtering device 100. For example, the device illustrated with FIG. 1*b* may be implemented on a device 100 as illustrated in FIG. 1*a*. Device 100 may comprise a data interface configured to retrieve data from a database, e.g., a data interface such as illustrated with respect to FIG. 1*a*.

Device 100 comprises a memory 140. Memory 140 may be configured to store multiple widget codes corresponding to multiple widgets. A widget is a visual element which is used in data visualizations. A widget may be implemented by widget code, e.g., a widget routine and corresponding widget data. A widget may also be implemented as a widget object, e.g., in an object oriented programming language. The widget code may comprise data which effects various aspects of the widget. In particular, a widget code comprises a widget location. The widget location indicates a display region for displaying the corresponding widget on a display. There are various ways in which a display region can be indicated. For example, in an embodiment the display regions are rectangular. For example, a rectangular display region may be indicated by coordinates of two diametrically opposed corners. For example, a rectangular display region may be indicated by coordinates of one corner and size information of the rectangle. Other shapes of the display region are also possible. For example a display region may be circular or ellipsoid. In the latter cases, the display region may be indicated by one or more centers and or more radii, etc.

Typically, display regions do not overlap. The data filtering method may enforce this, e.g., by not allowing widgets to be moved or resized if this would case overlap. Alternatively, the filtering device may generate an error message. However, it is also possible to let the widgets overlap, and leave it to the user if he accepts this or not.

Embodiments may be use various types of widgets. Widgets of different types may share some functionality, but differ in other respects. In an embodiment, at least two different types of widgets may be used: widgets of filtering type, filtering widgets for short, and widgets of visualization type, visualization widgets for short. These two types of widgets have a lot of functionality in common. For example, both may be processed by rendering code for rendering the widgets on a screen. For example, the widget code of both types may comprise a widget location to indicate the location on the display screen. There may also be differences. For example, a widget of filtering type may have widget code to obtain a filtering parameter. A widget of visualization type may have widget code configured to visualize data on the display. The widget codes may also store an indication of their widget type. Memory 140 shows widget code 141 and widget code 142. There may be more than two widget codes in memory 140.

Figure 3A:
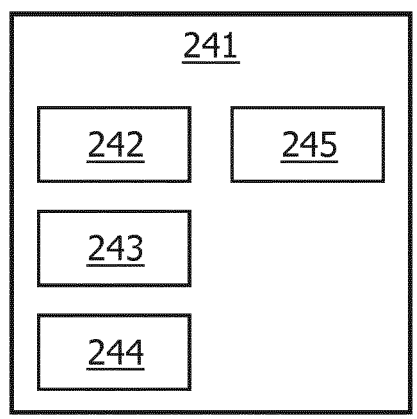

FIG. 3*a* schematically shows an example of an embodiment of a visualization widget code 241. Visualization widget code 241 may comprise a widget location 242, rendering data 243, executable code 244 and a data binding 245. A visualization widget code does not need to comprise all of these elements. For example, it may not comprise executable code 244, rendering data 243, etc.

Figure 3B:
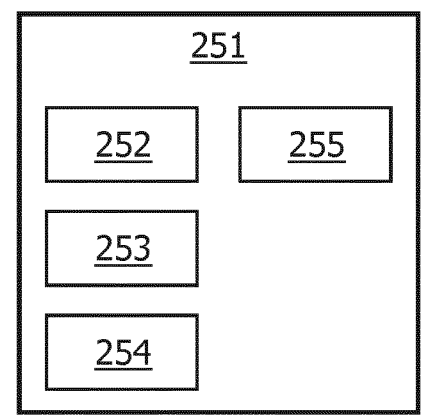

FIG. 3*b* schematically shows an example of an embodiment of a filtering widget code 251. Filtering widget code 251 may comprise a widget location 252, rendering data 253, executable code 254 and a filter parameter 255. A filtering widget code does not need to comprise all of these elements. For example, it may not comprise executable code 244, rendering data 253, etc.

Returning to FIG. 1*b*, memory 140 may comprise multiple widgets codes. In an embodiment, the multiple widget codes comprise at least one visualization widget code and at least one filtering widget code. In an embodiment, the multiple widget codes comprise multiple visualization widget code and at least one filtering widget code. In an embodiment, the multiple widget codes comprise at least one visualization widget code and multiple filtering widget code. Memory 140 may comprise widgets codes of other types as well, e.g., of meta-data type, described below, etc.

Device 100 of FIG. 1*b* may further comprise a rendering unit 160. Rendering unit 160 is configured to render the multiple widgets in a data display, e.g., a dashboard, on a display screen. For example, rendering unit 160 may be configured to iterate over the multiple widgets and for each of the widgets execute corresponding rendering code to render the widget on the display.

For example, rendering unit 160 may comprise an iterator 161. Iterator 161 may be configured to iterate over the multiple widgets. For example, the widgets may be indexed in a data structure. For example, the data structure may be list; for example, the iterator may iterate over the list.

After iterator 161 has iterated over each widget, then iterator 161 may start again with the first widget, repeating the iteration. Preferably however, iterator 161 pauses rendering until a change occurs that requires to update the rendering. For example, the user may change the data display which may necessitate to update the rendering.

In an embodiment, rendering unit 160 may comprise a selector 162, data obtaining unit 163 and visualization unit 164 for rendering widgets of visualization type. For example, rendering unit 160 may comprise a further rendering part 165 for rendering other types of widgets. In this example, iterator 161 iterates over all widgets regardless of type; iterator 161 is configured to execute the correct code, e.g., units 162-164 or unit 165. However, in an embodiment, separate iterators depending on type may be used. For example, an embodiment may comprise a first iterator for iterating over visualization widgets and a second iterator for iterating over, at least, filtering widgets. Rendering part 165 and visualizing unit 164 may render the widget at a display region of a display corresponding to the widget location.

Data filtering device may comprise units for other functions, e.g., such as commonly found on data filtering device and/or data display devices, etc.

Interestingly, the way a filtering widget affects a visualization widget depends on their relative positioning and/or size. A filtering widget that has an effect on a particular visualization widget is termed a controlling widget for that particular visualization widget. It may well be that a given filtering widget is a controlling widget for one visualization widget but not for another. Whether or not a filtering widget is a controlling widget is determined by a control rule. The control rule depends on the widget location, e.g., on the display region, their relative position and/or size. Various examples are given below.

Selector 162 is configured to select from the multiple widgets, the controlling widgets of filtering type. For example, selector 162 may receive from iterator 161 as input a visualization widget and may be configured to select the controlling widgets of filtering type for that particular visualization widget. Selector 162 may be configured with the control rule. The control rule may take as input the widget location of the widget of visualization type and the widget location of the widget of filtering type, and produce as output whether the filtering widget is a controlling widget for that visualization widget. It may be the case that there are no controlling widgets for one or any of the visualization widgets. It may be the case that there are multiple controlling widgets for one or all of the visualization widgets.

Data obtaining unit 163 is configured to obtain data from database 133. If there are no controlling widgets then the data may be obtained in a default manner, e.g., as set in the visualization widget. However if there are one or more controlling filtering widgets then the data may be obtained filtered according to the filtering parameter of the selected controlling widgets. For example, a first controlling widget may correspond to a filtering parameter which indicates an age-range of test subjects. In that case, the obtained data is filtered according to the age-range. For example, a second controlling widget may correspond to a filtering parameter which indicates a gender of test subjects. In that case, the obtained data is filtered according to the gender. If both the first and second filtering widgets are controlling then data is obtained according to both the age and the gender filter.

For example, a filtering parameter may be a constraint, e.g., a constraint on the data rendered by a visualization widget. For example, the constraint may be a constraint on a property of the data, e.g., an element in records of the database. For example, a constraint may be a larger than, smaller than, equal, between constraint, etc., which may be associated with a property, e.g., the property age, gender, or the like. The filtering parameter may further comprise limits for the constraint, e.g., the constraint that age equals 45, which may cause the data to be constraint to those records that contain an age property with the value 45.

In an embodiment, a database record has multiple properties or attributes that may have a value. A filter parameter may comprise a reference to one or more properties and a constraint on them. The database query may then be restricted to such records. Note that some type of summarization will typically be imposed as well. For example, the visualization widget may be configured to display a time series, or number of records of certain types, etc. As shown below, the output of a visualization widget may be changed as well.

A filtering widget may also be used to manipulate the data, e.g., apply a calculation to it, e.g., adding or applying a particular forecasting method. The visualization widget may apply the manipulation, e.g., the calculation or the forecasting method, e.g., as expressed in a filtering parameter or as expressed in a filtering executable code.

For example, data obtaining unit 163 may be configured to arrange a database query comprising parameters obtained from the filtering parameters of the controlling widget. For example, the data obtaining unit 163 may be configured with a template database query. For example, the visualization widget may be configured with a template database query; for example, the latter may be present in a data binding. For example, the template may be configured how to arrange the database query taking into account various filtering parameters.

Finally, the filtered data is visualized in visualization unit 164. Visualization unit 164 may use any data visualization as is known in the art. For example, visualization unit 164 may be configured to render a gauge, a graph, a histogram, a bar graph, etc. The data that is rendered is the data obtained by the data obtaining unit 163, possibly after a further processing step, e.g., bucketing, rounding, truncating, etc. For example, data obtaining unit 163 may retrieve the number of test subjects with the specified age and gender for a number of different years. The visualization unit 164 may visualize this data in the form of a line graph or a bar graph or the like.

The semantic meaning of the filtering parameters is not relevant to the technical operation of the system. For example, an embodiment may filter for, say, energy consumption of electronic devices instead of for age or gender, etc. Likewise, the type of visualization can be adapted as desired.

Rendering unit 160 may comprise a further rendering part 165 configured to render other widgets. For example, further rendering part 165 may be configured to render a widget of filtering type. Rendering a filtering widget may comprise displaying a parameter input on the display for receiving the filtering parameter from a user of the data filtering device.

Figure 2:
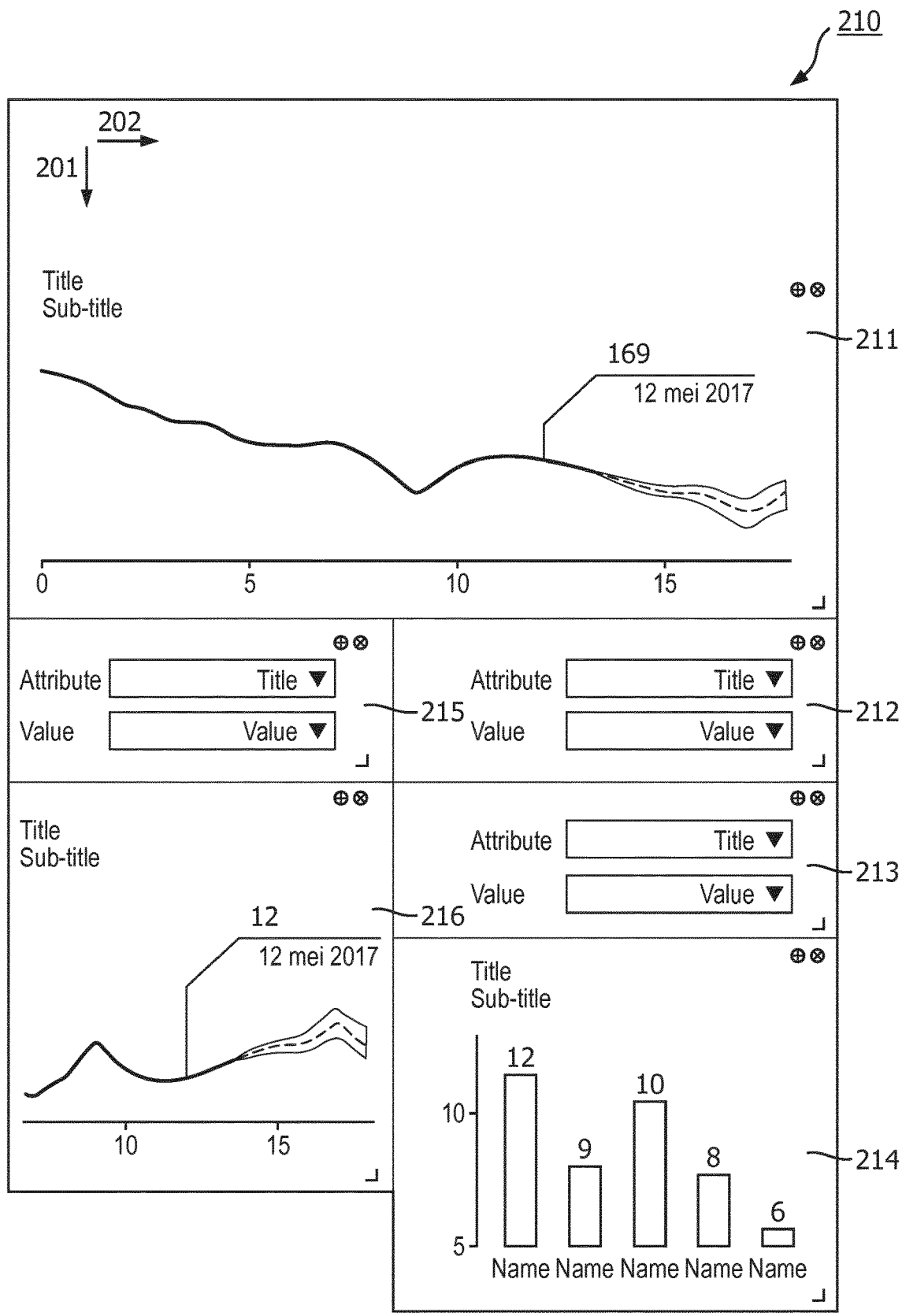

Data filtering device 100 may comprise an input unit 170 to receive input from the user, e.g., through user input interface 135. For example, user input 170 may receive input to set a filtering parameter. For example, user input 170 may receive an age range, e.g., from a keyboard, or by interacting with the display, e.g., by touch or mouse, e.g., to set a knob, slider or the like to set the age or age range, etc. FIG. 2 shows show pull down menu's for this purpose. For example, user input 170 may receive input to move or resize a widget. As explained below, moving or resizing a widget may change which widgets are controlling. Input unit 170 may be configured to modify the widget code in memory 140 in correspondence to the received input, e.g., by changing filtering parameters, and widget locations.

Returning to FIGS. 3a and 3b. Rendering a widget may be affected by widget location 242 and 252, which may, e.g., set the display region, e.g., location and size on a display. Rendering a widget may be affected by rendering data 243 and 253. The rendering data may select a rendering style, background, colors and the like. The widget codes may comprise executable code 244 and 254. The executable code allows a lot of flexibility to the designer of the data display. The executable code may determine how data is retrieved, processed, filtered, visualized, and the like. The data binding may comprise information on how to obtain the data. For example, the data binding may comprise a computer address, e.g., a URL. For example, the data binding may comprise a computer address of a database. For example, the data binding may comprise a database query, or data base query template, etc. For example, the filtering parameter may be a parameter that may be used in the database query. The data binding may comprise a computer address, e.g., a network address or a pointer, etc., e.g., to a time series, data base, etc.

For example, a visualization widget may comprise, e.g., in its rendering data, an indication for a graph type, e.g., a bar graph, or a line graph. This may be sufficient for execution by the rendering unit. On the other hand, the visualization widget may encode for a novel type of data visualization, which may be implemented by encoding the novel data visualization in executable code. In both cases, may the data, e.g., the time series, be filtered by a filtering parameter.

Once iterator 161 has rendered all widgets, the display may be kept static. However, if user input is received from the user input interface, e.g., to change a widget location and/or a display region of a widget according to user input received at the user input interface, then the affected widgets may be rendered again. If control relations between filtering and visualizing widgets change, then the affected visualizing widgets may be rendered again as well.

FIG. 2 schematically shows an example of an embodiment of a data display 210. Shown are visualization widgets 211, 214, 216 and filtering widgets 212, 213, 215. For convenience in discussion, an x-axis 202 and a y-axis 201 are shown as well. Coordinates increase in the direction of the arrows. FIG. 2 illustrates a first example of a control rule.

According to this embodiment of a control rule, the control rule determines a filtering widget to be a controlling widget for a visualization widget, if the control rule determines an overlap in the x-coordinates of the display region of the first widget and the x-coordinates of the display region of the second widget, and that the y-coordinates of the display region of the first widget compared to the y-coordinates of the display region of the second widget are smaller or equal. Consider filtering widget 215 and visualization widget 216. The x-coordinates of filtering widget 215 span from, say, 0 to 10; the x-coordinates of visualization widget 216 also span from, say, 0 to 10. Accordingly, the x-coordinates overlap. The y-coordinates of widget 215 span from 10 to 15 and the y-coordinates of widget 216 span, say, from 15 to 25. That is all y coordinates of widget 216 are at least as high as those of widget 215.

For example, consider a coordinate span from a to b and a coordinate span from c to d; we assume a<b and c<d. The coordinate span from a to b may be said to overlap a coordinate span from c to d, e.g., if a<d and c<b. A minimum overlap may be required though. For example, one may require that (d−a) and (b−c) are both larger than a positive threshold overlap value. The threshold overlap value may be chosen in dependence on the visual acuity of a human user on the given equipment. As another, one may require that one of the coordinate spans is contained in the other. For example, one may require that (a=c) or (d=b), which also implies that the spans overlap.

For example, a coordinate span from a to b may be said to be at least as low as a coordinate span from c to d, if, e.g., b<=c. For example, a coordinate span from a to b may be said to be at least as high as a coordinate span from c to d, if, e.g., d<=a.

For FIG. 2, the control rule may be taken that x-coordinates must overlap and the y-coordinates must increase. Applying this rule means that filtering widget 215 is controlling for visualization widget 216, but not for visualization widgets 211 and 214; filtering widgets 212 and 213 are controlling for visualization widget 214 but not for visualization widgets 216 and 211. There are no controlling widgets for visualization widget 211. In an embodiment, a visualization widget can be controlling for another visualization widget as well, otherwise following the same control rule. Applying that modification would imply that visualization widget 211 is controlling for visualization widgets 216, and 214. One way this could be useful, is to pass on data bindings. For example, visualization widget 211 may be programmed with a data binding. That data binding is passed on to visualization widgets 216 and 214. However, they may be filtered in a different manner, since the latter two visualization widgets have different controlling filtering widgets.

For example, selector 162 may be configured to select from the multiple widgets, the controlling widgets with a particular type. The particular type may be chosen from a group comprising at least filtering and visualization type. A widget is controlling according to the control rule. Data obtaining unit 163 may be configured to obtain data from the database filtered according to the filtering parameter and/or according to the data binding of the selected controlling widgets.

If two or more controlling widgets have contradicting, e.g., have incompatible filter parameters, or data bindings, etc., a resolution rule may be used, e.g., selecting the filter parameters, or data bindings that are closest to the visualization widget that is being rendered. Alternatively, an error message may be displayed, etc.

In the example illustrated in FIG. 2, control acts downwards on the screen. Alternatively, it may be required that y coordinates decrease so that control acts upward. The rule may be rotated 90 degree so that control acts to the left or right. In yet a further variant control may act two ways, e.g., both upwards and downwards, etc., e.g., by removing a condition on an increase/decrease in a coordinate from the control rule.

The control rule in FIG. 2 makes it easy for a user to determine from the display which filters apply to which visualization. Moreover, applying a filtering widget to a different visualization widget may be done by moving the filtering widget or by changing its size. These operations may be done using a conventional input modality, e.g., a touch screen or a mouse, e.g., to drag and drop or resize a widget.

Figure 4A:
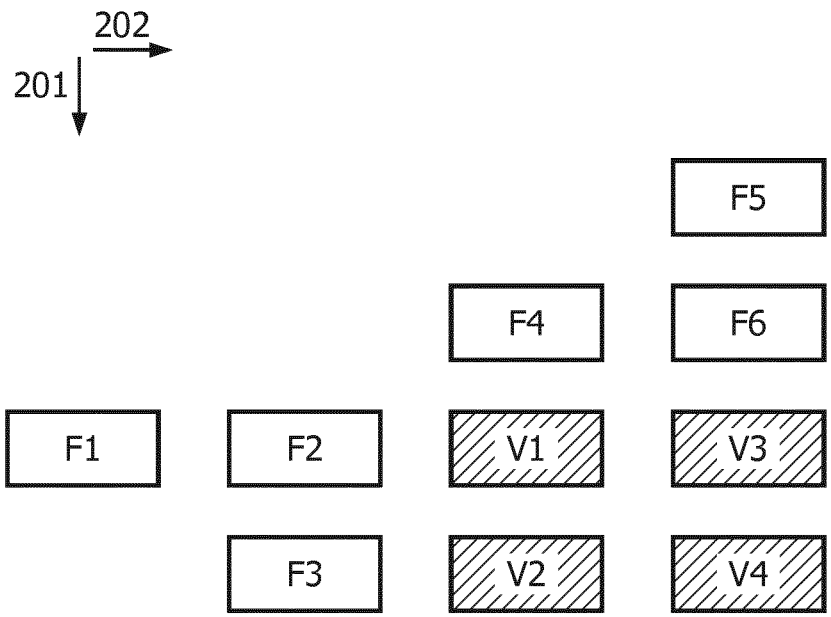

FIG. 4a schematically shows an example of an embodiment of a data display, e.g., a dashboard with visualization widgets V1-V4 and filtering widgets F1-F6.

In the example shown in FIG. 4 a control rule is used in which control acts to the right and downwards. For example, using the exemplifying x and y axes, the control rule may determine that a first widget of filtering type is a controlling widget for a second widget of visualization type, if there is an overlap in the x-coordinates of the display region of the first widget and the x-coordinates of the display region of the second widget, and y-coordinates of the display region of the first widget that are at least as low as y-coordinates of the display region of the second widget, (that is control acts towards higher y-coordinates), but also if there is an overlap in the y-coordinates of the display region of the first widget and the y-coordinates of the display region of the second widget, and x-coordinates of the display region of the first widget that are at least as low as x-coordinates of the display region of the second widget.

In other words, control acts both to the right and downwards. Applying this rule in the context of FIG. 4 would yield the following:

F1, F2, F4 are controlling for V1
F3, F4 are controlling for V2
F1, F2, F5, F6 are controlling for V3
F3, F5, F6 are controlling for V4.

Figure 4B:
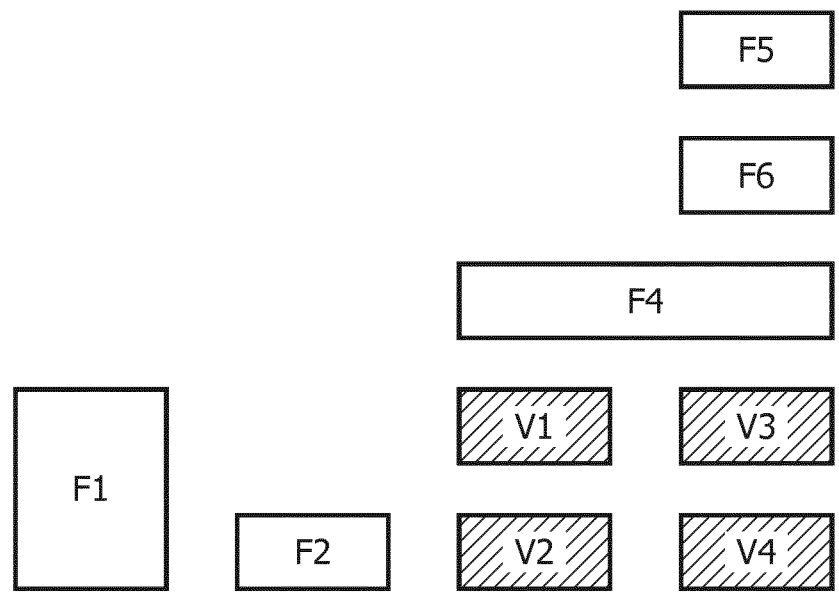

FIG. 4b shows the same data display as in FIG. 4a except that a user has made a few modifications. The user has
  deleted filtering widget F3, e.g., by clicking on a trashcan icon, etc.,
  moved filtering widgets F2, F5 and F6, e.g., by dragging and dropping a side of the widget, and
  resized filtering widgets F1 and F4, e.g., by dragging on a corner of the widgets.
As a result the control of the filtering widgets changed. In FIG. 4b, following the same control rule:

F1, F4 are controlling for V1
F1, F2, F4 are controlling for V2
F1, F4, F5, F6 are controlling for V3
F1, F2, F4, F5, F6 are controlling for V4.

Note that in this example, the control rule also depends on a size of the display region of the widget of visualization type and the widget of filtering type. This is not necessary though. For example, all widgets may have the same size. Furthermore, note that in this display, the user can selectively arrange a filtering widget, e.g., widget F2 to be a controlling widget for different visualization widgets; For example, moving widget F2 caused it from a controlling widget for V1, but not V2 to a controlling widget for V2 but not V1. The same may be seen in the examples given for FIG. 2.

Many other example may be generated from FIGS. 4a and 4b by removing one or more of the filtering widgets or visualization widgets. For example, one may remove widgets F3, V2, and V4 from FIG. 4a to obtain a further example data display.

Figures 5A, 5B:
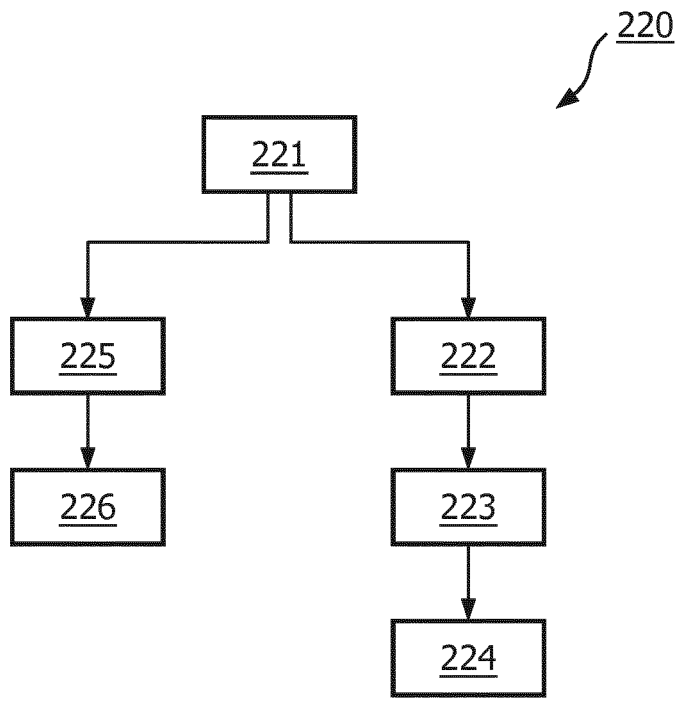

The relation between the widgets can be represented using one or more trees. FIG. 5a schematically shows an example of a tree data structure 220 created for the data display of FIG. 2. For example, data filtering device 100, e.g., selector 162, may be configured to generate and/or use a tree data structure 220 to determine which widgets are controlling. For example, the device may be configured to iterate through the multiple widgets building a tree data structure indicating the controlling widgets. For example, the widgets may be iterated through from top to bottom and from left to right, while building the tree. Tree nodes 221-226 correspond to widgets 211-216. In the tree an edge is drawn between two nodes if they are directly adjacent. Once a tree has been obtained, it can be used to obtain controlling widgets. For example, to obtain the controlling widgets for visualization widget 214, the tree is followed to the root starting at node 224. Thus obtaining the nodes 221, 223 and 222 corresponding to filtering widgets 213 and 212, and optionally visualization widget 211.

FIG. 5b schematically shows an example of a widget table created for the data display of FIG. 2. The columns show coordinates of widgets 211-216
  231 a top-left X-coordinate
  232 a top-left Y-coordinate
  233 a bottom-right X-coordinate
  234 a bottom-right Y-coordinate For example, the table may be stored in memory. For example, iterator 161 may be configured to iterate through the first column. For each visualizing widget, selector 162 may be configured to also iterate through the first column, except for the widget current selected by iterator 161. Selector 162 can then apply the control rule to the widget location information, in this case coordinates of opposite corners. For example, during the iteration, iterator 161 may select the row of widget 216. Selector 161 may then go through the first column again, and consider, e.g., row 212. Selector 162 may then determine that the span of the x-coordinates do not overlap and so there is no controlling relation, even though the y-coordinates do increase. The widget table approach can be applied to other control rule as well, e.g., the control rule used in FIG. 4a.

Various embodiments disclose an interactive principle that allows components to be context aware. Interaction with one component has effect on the other components following a control rule. The data on which the widget acts is determined by the location of other widgets In conventional dashboards, a user can easily get lost especially when interacting with a complex dashboard. It is not clear how the changes in one dashboard component influence the other data visualization widgets. It is difficult to determine how manipulations you apply modify the actual screen that is represented. In embodiments however, a user can create very advanced dashboards yet still quickly glance how the data is being filtered.

In an embodiment, a dashboard can be created on a visual grid. In an embodiment, a visualizing widget may change appearance based on its size. For example, the more physical pixel space it is given, the more data detail will be shown. The size of the visualizing widget may be determined by the filtering widgets. This is illustrated in FIGS. 6a-6e.

FIGS. 6a-6e show screenshots of an embodiment of a data filtering device. The screenshots are taken from a prototype, using data manufactured for the experiment. The manufactured data relates to hospitalization, but the subject of the data is immaterial. The control rule is the same as in FIGS. 4a and 4b, e.g., acting to the right and downwards. The prototype was programmed using the JavaScript React library.

Figure 6A:
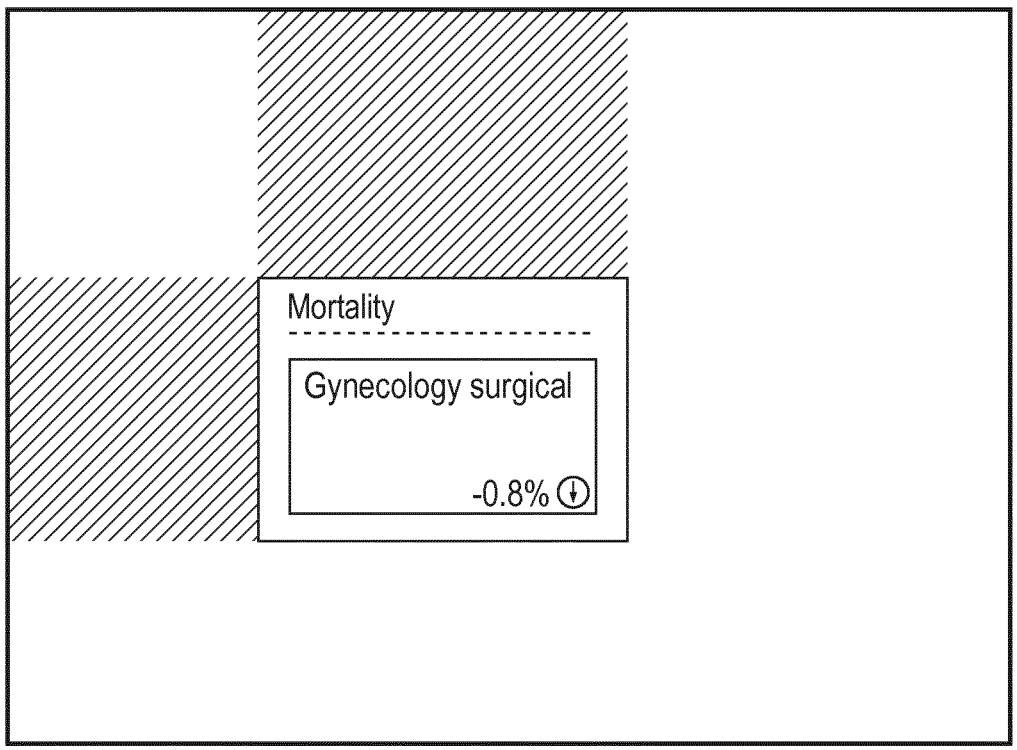
Figure 6B:
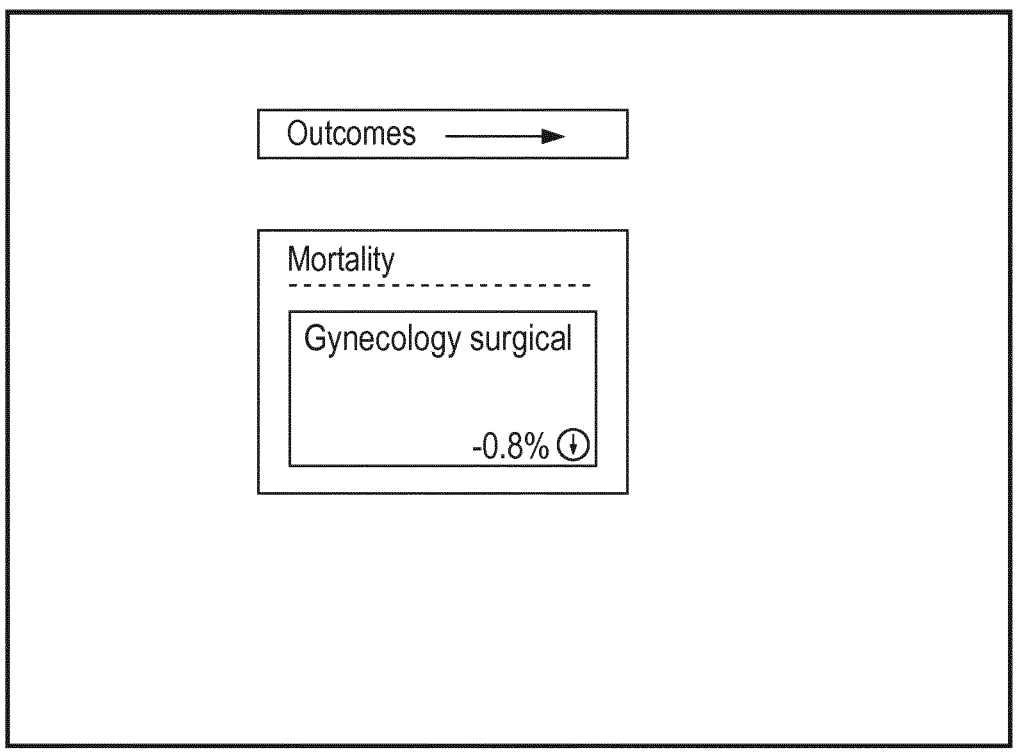

FIG. 6a shows a visualization widget that is placed on a grid. In FIG. 6b a filtering widget is added at the top of the visualization widget. Note that FIG. 6b (without the grid) is shown in operation, while FIG. 6a is shown in configuration (with grid). In FIG. 6c a widget with meta-data is added. In this case the meta-data widget at the top of FIG. 6c shows a title. A widget with meta-data type, e.g., a title, does not affect any of the other widgets in the data display. Furthermore, in FIG. 6c a user has extended the size of the filtering widget. In this case, the filtering widget sets the number of 'outcomes' that are shown. In response the visualization widget has extended its own display region and displays more outcomes. In this particular example, the shown outcomes have increased from only 'Mortality' to 'Mortality', 'Length of stay', 'Readmission', and 'Complications'.

Figure 6D:
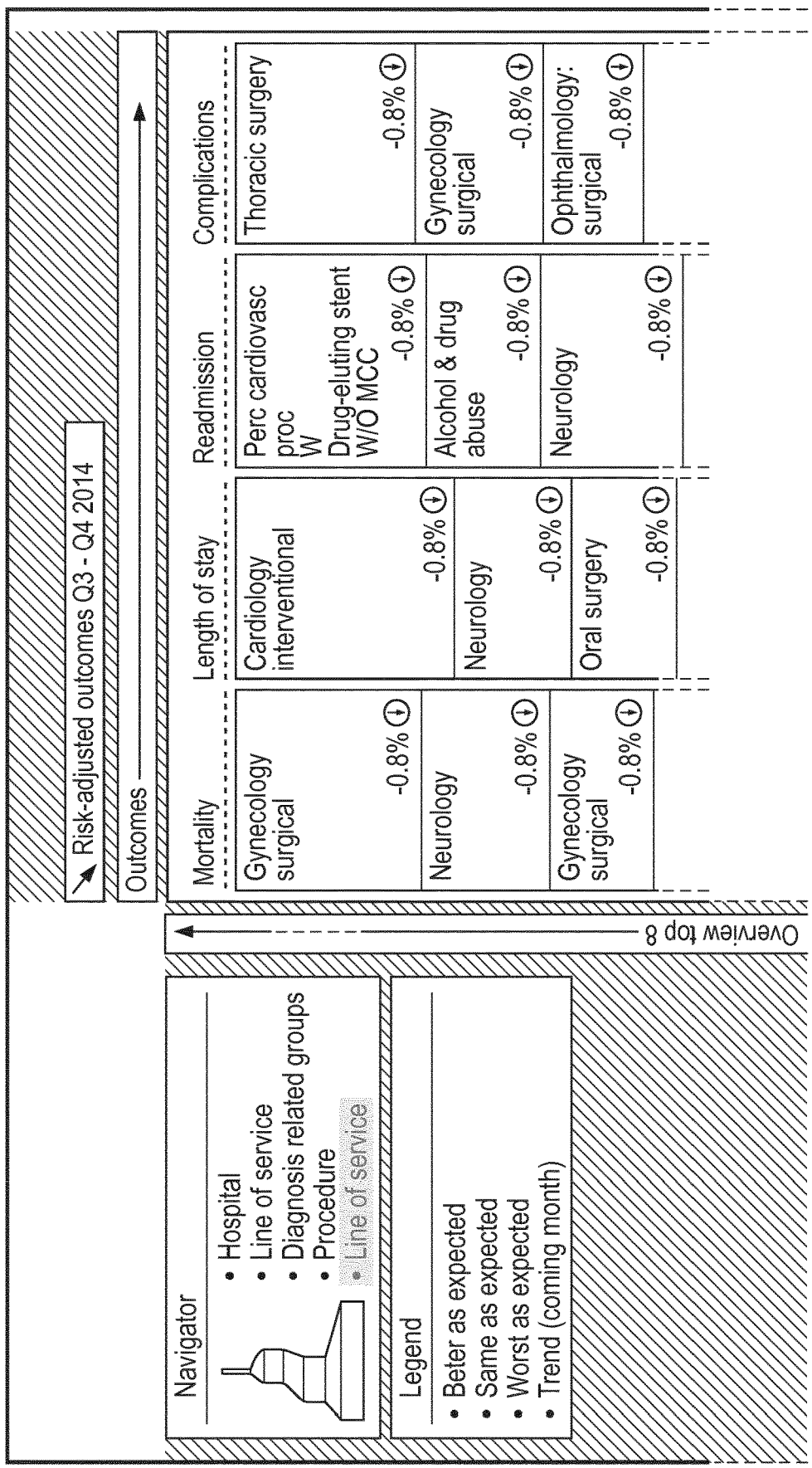
Figure 6D:
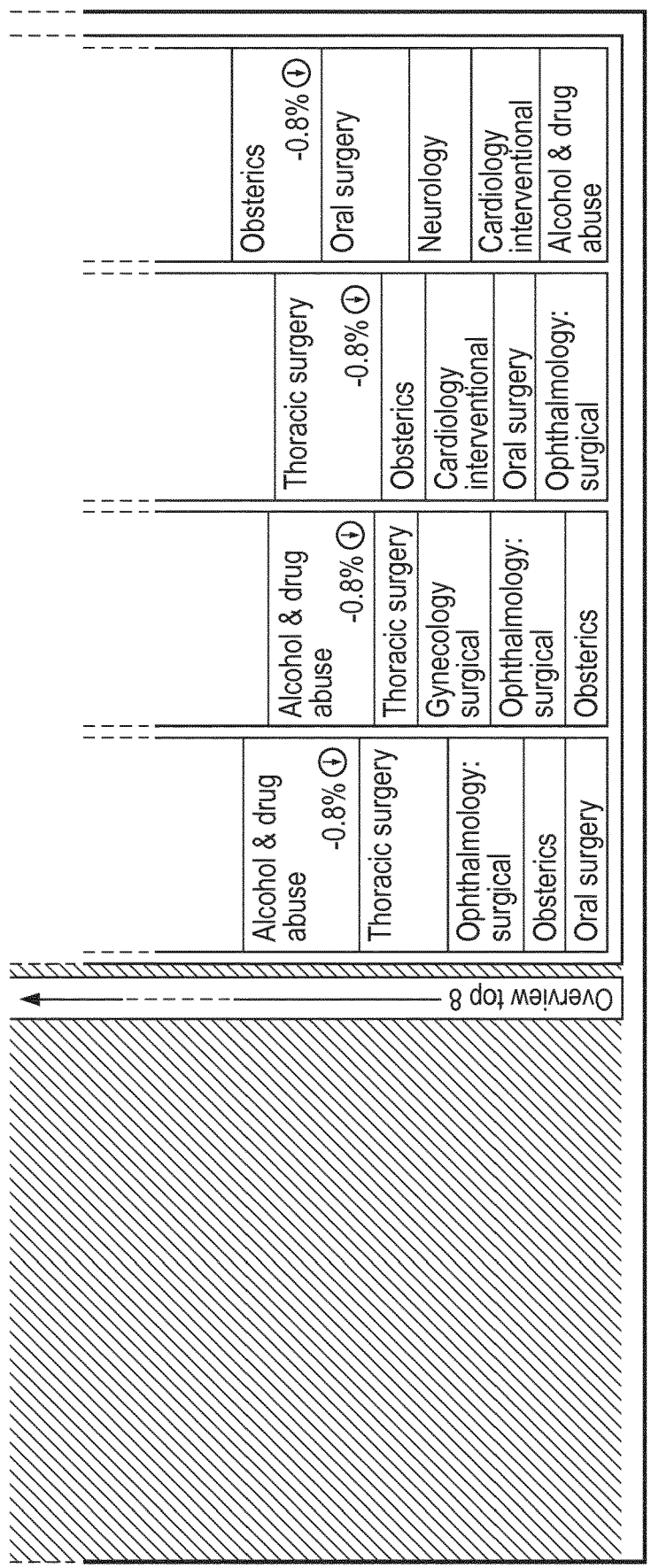

In FIG. 6d a further filtering widget has been added at the left of the visualization widget. The left filtering widget is also extended, as a result of which the visualization widget further extends the shown detail. In this particular example, the left filtering widget changed from 'Overview Top 1' to 'Overview Top 8', e.g., a filtering parameter increased from 1 to 8. As a result the visualization widget shows an extended overview, e.g., from top-1 to top-8. For example, the first column increased from 'Gynecology Surgical' to 'Gynecology Surgical', 'Neurology', 'Gynecology Surgical', 'Alcohol & Drug abuse', 'Thoracic Surgery', 'Ophthalmology: Surgical', 'Obstetrics', and 'Oral Surgery'.

Also shown at the left of FIG. 6d are two further meta-data widgets. The top left widget is a 'navigator' widget. The widget below it shows a 'legend' that explains the meaning of the colors in the display.

Figure 6E:
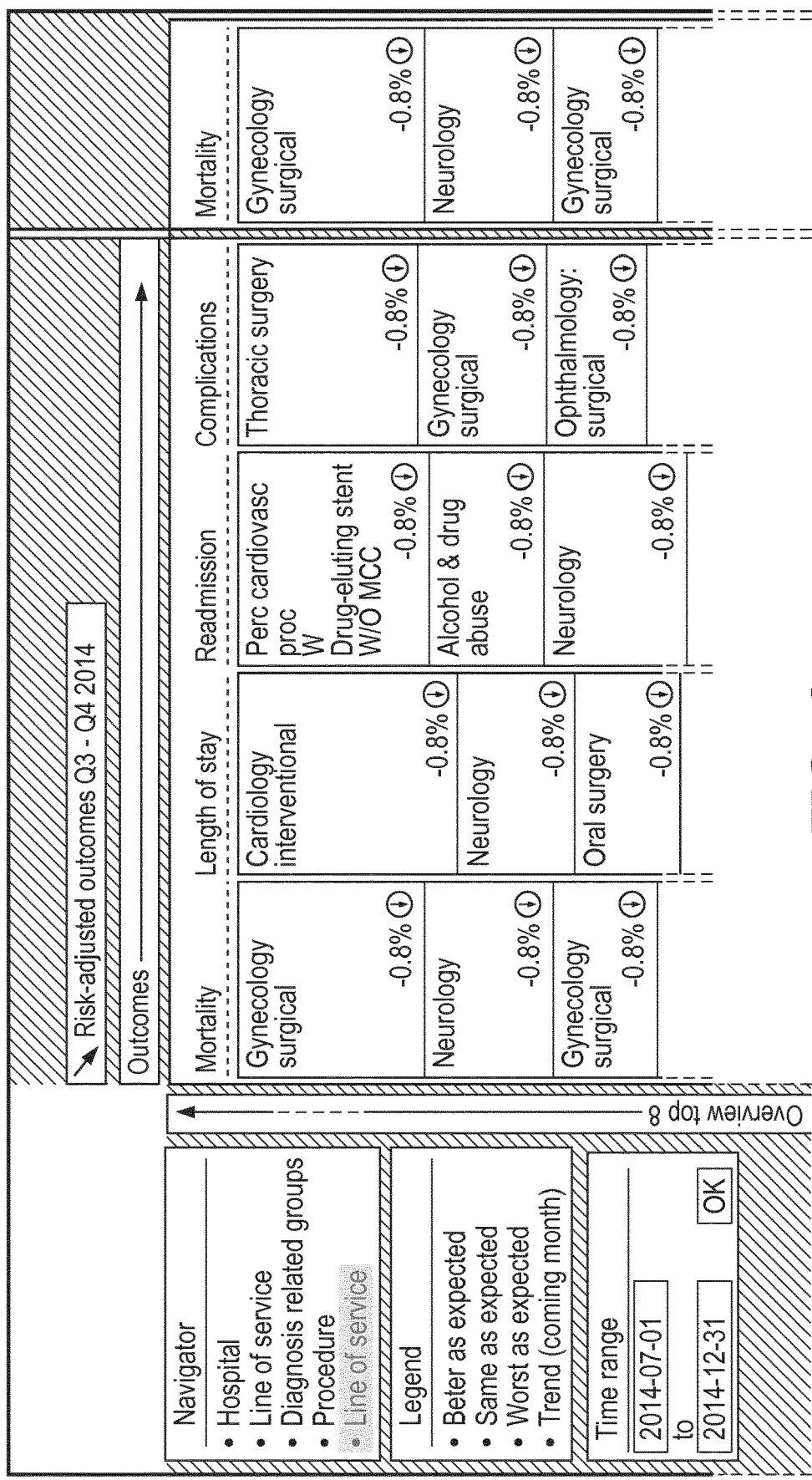
Figure 6E:
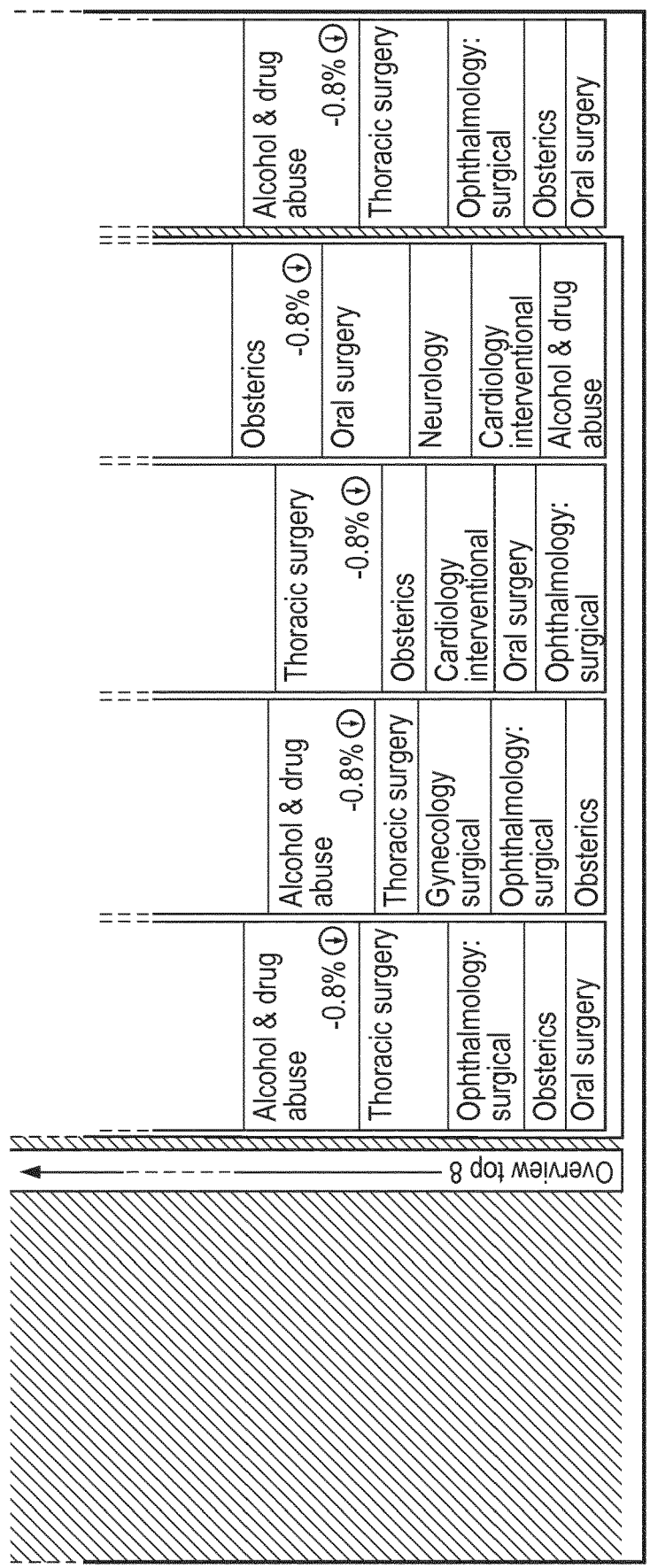

In FIG. 6e an additional visualization widget is placed. In this example, the same visualization widget as in the above figures is repeated. Note that the 'overview' widget on the left applies to both visualization widgets, but that 'outcomes' widgets at the top only applies to the left visualization widget. Thus, the left visualization widget has multiple columns, but the right visualization widget has a single row according to the widget's default. Furthermore, a filtering widget has been placed at the bottom left. The filtering widget is marked 'Time Range'. In the widget, as user can set two dates. As a result, the data in both the visualization widget is filtered to the date range.

FIGS. 6a, 6d and 6e are screen shots taken when the device is in configuration mode. For example, a data filtering device may have a configuration mode and a use mode. In the configuration mode, new widgets can be added to the data display. In the use mode, a user may change the location and/or size of the widgets but possibly not their number. In configuration mode, a darker shadow emanating from visualization widgets indicates where filtering widgets may be placed so that they have effect on the visualization widget. A data display may be exported when it finished so that it can no longer be switched to configuration mode.

In the various embodiments of the data filtering device, a communication interface may be included, e.g., selected from various alternatives. For example, the interface may be a network interface to a local or wide area network, e.g., the Internet, a storage interface to an internal or external data storage, a keyboard, an application interface (API), etc.

The data filtering device may have a user interface, which may include well-known elements such as one or more buttons, a keyboard, display, touch screen, etc. The user interface may be arranged for accommodating user interaction for performing moving, resizing, etc., of widgets.

The data display may comprise a storage, which may be implemented as an electronic memory, say a flash memory, or magnetic memory, say hard disk or the like, or optical memory, e.g., a DVD. The storage may comprise multiple discrete memories together making up the storage. Storage may comprise a temporary memory, say a RAM. The storage may be used to implement database 133 and/or memory 140, etc.

Typically, a data filtering device, e.g., data filtering device 100, or any data filtering device illustrated in FIGS. 2-6e may comprise a microprocessor which executes appropriate software stored at the data filtering device; for example, that software may have been downloaded and/or stored in a corresponding memory, e.g., a volatile memory such as RAM or a non-volatile memory such as Flash. Alternatively, the data filtering device may, in whole or in part, be implemented in programmable logic, e.g., as field-programmable gate array (FPGA). The data filtering device may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, a data filtering device may comprise a memory circuit, a rendering circuit, an iterator circuit, a selector circuit, a data obtaining circuit, a visualization circuit, a further rendering circuit, and an input circuit. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

The data filtering device provides the technical means for generating data displays, and in particular interactive data displays. For example, the iterator, selector and data obtainer may cooperate to process data, e.g., data in a database, display it in a data display and/or process modifications to the data display. A user who has the purpose of analyzing the data is served by the data filtering device since configuring filters can be done quicker, using less screen space. Moreover, troubleshooting configuration problems will be easier and quicker since a user can determine quickly which filtering widgets affect which visualization widgets. Using a control rule as described herein assists a user when interacting with the data filtering device, since the internal configuration, e.g., which data is filtered and how, can be determined from the data display by the user. Moreover, the guidance may be continued as the user can continue to adapt the widgets on the display, so as to achieve a desired filtering effect.

Input of the user may be reflected in an internal data structure such as a widget tree or table, e.g., as shown in FIGS. 5a and 5b. Using the data structure, the data filtering device is configured to effectively determine which data queries need to be made to the database, using the appropriate filtering. The internal data structure may determine which filtering parameters control which data retrievals and visualizations. Such internal data structures are neither visible to the user, nor intelligible to him. However, in an embodiment the dependencies between the various widgets are communicated to the user efficiently.

For example, a user may determine at glance that filtering widget F2 in FIG. 4a applies to visualization widgets V1 and V3, but to visualization widgets V2 and V4, in FIG. 4b. Supposing that the user had desired the latter, then the information displayed to him in FIG. 4a will enable him to determine that the filtering widget F2 is not applied to the correct visualization widgets. Moreover, he can quickly correct the situation, e.g., until he has the desired effect shown in FIG. 4b. Accordingly, the data filtering device has improved filtering. The data filtering device enables the user to perform the technical task of interactively setting and configuring filters for a data-query operation.

A data display according to the embodiment has the advantage of using less screen space. For example, a given filtering widget may be applied to multiple visualization widgets, yet needs to be shown on the display only once. For example, all of the visualization widgets that are shown under a particular filtering widget may all have the same filtering applied. Furthermore, by showing the filtering widget only once for multiple visualization widgets it is also avoided that the filtering widgets may inadvertently have different values for different visualization widgets.

The following clauses are not the claims, but include contemplated embodiments. The Applicant hereby gives notice that new claims may be formulated to such clauses and/or combinations of such clauses and/or features taken from the description or claims, during prosecution of the present application or of any further application derived therefrom.

Clause 1. A data filtering device comprising
  a data interface configured to retrieve data from a database,
  a memory configured to store multiple widget codes corresponding to multiple widgets, a widget code comprising a widget location indicating a display region for displaying the corresponding widget on a display, a widget of filtering type having widget code to obtain a filtering parameter, a widget of visualization type having widget code configured to visualize data on the display, and
  a processor configured to render the multiple widgets on the display, the rendering comprising for a widget of visualization type,
    selecting from the multiple widgets, the controlling widgets of filtering type, wherein a widget is controlling according to a control rule, said control rule depending on the widget location of the widget of visualization type and the widget location of the widget of filtering type,
    obtaining data from the database filtered according to the filtering parameter of the selected controlling widgets,
    visualizing the filtered data according to the widget code of the widget of visualization type.
Clause 2. A data filtering device according to any one of the preceding clauses, the data filtering device comprising a user input interface for receiving user input from a user input device, the processor being configured to
  change a widget location and/or a display region of a widget according to user input received at the user input interface,
  render said widget according to the changed widget location,
  repeat the rendering at least for widgets of visualization type having different controlling widgets due to the changed widget location.

Figure 7:
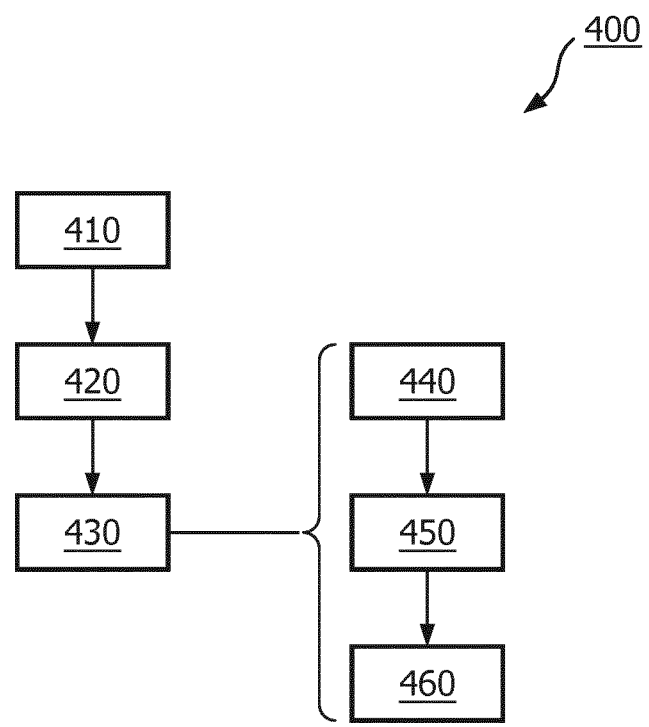

FIG. 7 schematically shows an example of an embodiment of a method 400 of filtering data. Method 400 may comprise
  providing (410) a connection with a database to retrieve data,
  storing (420) multiple widget codes corresponding to multiple widgets, a widget code comprising a widget location indicating a display region for displaying the corresponding widget on a display, a widget of filtering type having widget code to obtain a filtering parameter, a widget of visualization type having widget code configured to visualize data on the display,
  rendering (430) the multiple widgets on the display.
Rendering 430 may comprise for a widget of visualization type,
  selecting (440) from the multiple widgets, the controlling widgets of filtering type, wherein a widget is controlling according to a control rule, said control rule depending on the widget location of the widget of visualization type and the widget location of the widget of filtering type,
  obtaining (450) data from the database filtered according to the filtering parameter of the controlling widget,
  visualizing (460) the filtered data according to the widget code of the widget of visualization type.

Many different ways of executing the method are possible, as will be apparent to a person skilled in the art. For example, the steps can be performed in the shown order, but the order of the steps may also be varied or one or more steps may be executed in parallel. Moreover, in between steps other method steps may be inserted. The inserted steps may represent refinements of the method such as described herein, or may be unrelated to the method. For example, steps 440, 450 and 460 may be executed, at least partially, in parallel. Moreover, a given step may not have finished completely before a next step is started.

Embodiments of the method may be executed using software, which comprises instructions for causing a processor system to perform method 400. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 8A:
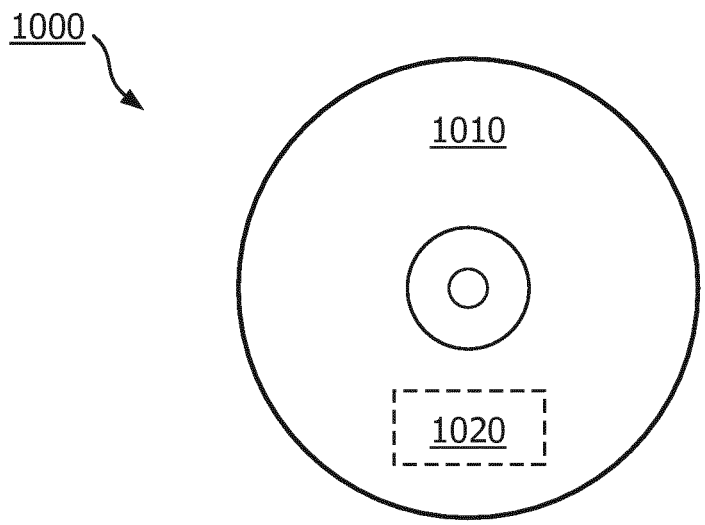

FIG. 8a shows a computer readable medium 1000 having a writable part 1010 comprising a computer program 1020, the computer program 1020 comprising instructions for causing a processor system to perform a data display method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said a data display method.

Figure 8B:
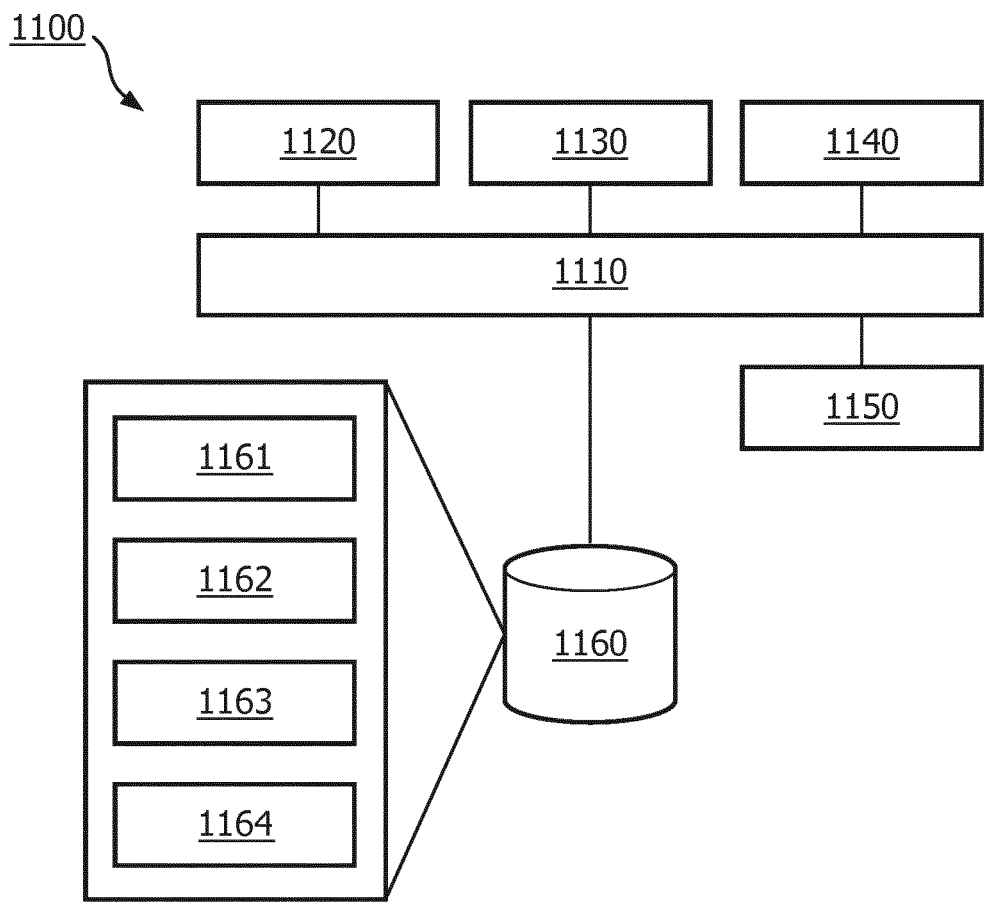

FIG. 8b illustrates an exemplary hardware diagram 1100 for implementing a data filtering device according to an embodiment. The exemplary hardware 1100 may correspond to one or more data filtering devices of illustrated with respect to FIGS. 1-7.

As shown, the device 1100 includes a processor 1120, memory 1130, user interface 1140, communication interface 1150, and storage 1160 interconnected via one or more system buses 1110. It will be understood that this figure constitutes, in some respects, an abstraction and that the actual organization of the components of the device 1100 may be more complex than illustrated.

The processor 1120 may be any hardware device capable of executing instructions stored in memory 1130 or storage 1160 or otherwise processing data. As such, the processor may include a microprocessor, field programmable gate array (FPGA), application-specific integrated circuit (ASIC), or other similar devices. For example, the processor may be an Intel Core i7 processor, ARM Cortex-R8, etc. In an embodiment, the processor may be ARM Cortex M0.

The memory 1130 may include various memories such as, for example L1, L2, or L3 cache or system memory. As such, the memory 1130 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 1140 may include one or more devices for enabling communication with a user such as an administrator. For example, the user interface 1140 may include a display, a mouse, and a keyboard for receiving user commands. In some embodiments, the user interface 1140 may include a command line interface or graphical user interface that may be presented to a remote terminal via the communication interface 1150.

The communication interface 1150 may include one or more devices for enabling communication with other hardware devices. For example, the communication interface 1150 may include a network interface card (NIC) configured to communicate according to the Ethernet protocol. For example, the communication interface 1150 may comprise an antenna, connectors or both, and the like. Additionally, the communication interface 1150 may implement a TCP/IP stack for communication according to the TCP/IP protocols. Various alternative or additional hardware or configurations for the communication interface 1150 will be apparent.

The storage 1160 may include one or more machine-readable storage media such as read-only memory (ROM), random-access memory (RAM), magnetic disk storage media, optical storage media, flash-memory devices, or similar storage media. In various embodiments, the storage 1160 may store instructions for execution by the processor 1120 or data upon with the processor 1120 may operate. For example, the storage 1160 may store a base operating system 1161 for controlling various basic operations of the hardware 1100. For example, the storage may store instructions 1162 for a data retrieval device to select a second index in a second array, instructions 1163 to data-obliviously compute a choice bit and/or instructions 1164 to replace a second element at the second index in the second array, etcetera. Or, the storage may store instructions 1162 for a data writing device to select a second index in a second array, instructions 1163 to data-obliviously compute a choice bit and/or instructions 1164 to replace a first element at a first index in a first array, etcetera. Or, the storage may store instructions 1162 for a retrieval verification device to receive a cryptographic verifiable computation proof and/or instruction 1163 to verify the cryptographic verifiable computation proof. Or, the storage may store instructions 1162 for a writing verification device to receive a cryptographic verifiable computation proof and/or instruction 1163 to verify the cryptographic verifiable computation proof.

It will be apparent that various information described as stored in the storage 1160 may be additionally or alternatively stored in the memory 1130. In this respect, the memory 1130 may also be considered to constitute a "storage device" and the storage 1160 may be considered a "memory." Various other arrangements will be apparent. Further, the memory 1130 and storage 1160 may both be considered to be "non-transitory machine-readable media." As used herein, the term "non-transitory" will be understood to exclude transitory signals but to include all forms of storage, including both volatile and non-volatile memories.

While device 1100 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1100 is implemented in a cloud computing system, the various hardware components may belong to separate physical systems. For example, the processor 1120 may include a first processor in a first server and a second processor in a second server.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A data filtering device comprising:
   a data interface configured to retrieve data from a database,
   a user input interface configured to receive user input from a user input device,
   a memory configured to store multiple widget codes corresponding to multiple widgets, a widget code comprising a widget location indicating a display region for displaying the corresponding widget on a display, the display region being non-overlapping with display regions of other widgets, and
   a processor configured to:
      render the multiple widgets based on the received user input on the display at display regions of the display corresponding to respective widget locations of the multiple widgets, the multiple widgets comprising a plurality of widgets of filtering type having widget code comprising one or more of an indication of widget type, a widget location, rendering data, executable code, and a filtering parameter, and a plurality of widgets of visualization type having widget code configured to visualize data on the display, the rendering for each of the plurality of widgets of visualization type comprising executing, by the processor, a set of instructions to select:
  a controlling widget of filtering type from the plurality of widgets of filtering type, wherein the controlling widget of the plurality of widgets of filtering type is controlling according to a control rule, said control rule depending on a widget location of the widget of visualization type and a widget location of the widget of filtering type at the display regions of the display,
    wherein the control rule determines a first widget of filtering type to be a controlling widget for a second widget of visualization type, the control rule comprising
      determining an overlap in the x-coordinates of the display region of the first widget and the x-coordinates of the display region of the second widget, and y-coordinates of the display region of the first widget that are at least as high or at least as low as y-coordinates of the display region of the second widget,
      determining an overlap in the y-coordinates of the display region of the first widget and the y-coordinates of the display region of the second widget, and x-coordinates of the display region of the first widget that are at least as high or at least as low as x-coordinates of the display region of the second widget,
  obtaining data from the database filtered according to the filtering parameter of the selected controlling widget, and
  visualizing the filtered data according to the widget code of the widget of visualization type at the display regions of the display.

2. The data filtering device according to claim 1, wherein the rendering for each of the plurality of widgets of visualization type further comprises determining multiple controlling widgets of filtering type for the widget of visualization type according to the control rule, said control rule depending on the widget location of the widget of visualization type and the widget locations of the widgets of filtering type.

3. The data filtering device according to claim 1, wherein the obtained data is obtained from the database by arranging a database query comprising parameters obtained from the filtering parameters of the controlling widget of filtering type.

4. The data filtering device according to claim 1, wherein the control rule further depends on a size of the display region of the widget of visualization type and the widget of filtering type.

5. The data filtering device according to claim 1, wherein the multiple widgets comprise a first widget of visualization type, a second widget of visualization type, and a third widget of filtering type, the control rule depending on the widget location of the third widget allowing the third widget to be a controlling widget for the first widget but not the second widget while at a first location, and allowing the third widget to be a controlling widget for the second widget but not the first widget while at a second location.

6. The data filtering device according to claim 1, wherein rendering a widget of filtering type comprises displaying a parameter input on the display for receiving the filtering parameter from a user of the data filtering device.

7. The data filtering device according to claim 1, wherein the widget code for the widgets of filtering type comprises configuration code configured to render a widget of visualization type by obtaining data and/or visualizing the filtered data according to the configuration code of the controlling widget of the widget of visualization type.

8. The data filtering device according to claim 1, wherein the processor is configured to iterate through the multiple widgets building at least one tree data structure indicating the controlling widgets.

9. The data filtering device according to claim 1, wherein the processor is configured to iterate through the multiple widgets building a table indicating the display region of the widgets, selecting controlling widgets for a visualizing widget comprising iterating through the widgets in the table different from the visualizing widget and applying the control rule.

10. The data filtering device according to claim 1, wherein the processor is further configured to:
  receive a user input at the user input interface,
  change a widget location and/or a display region of a widget according to the received user input, and
  render again said widget according to the changed widget location and/or display region, and rendering again widgets of visualization type having different controlling widgets due to the changed widget location and/or display region.

11. A method of rendering multiple widgets onto a display, the method comprising,
  retrieving data via a database,
  receiving user input from a user input device via a user interface,
  storing multiple widget codes corresponding to multiple widgets, a widget code comprising a widget location indicating a display region for displaying the corresponding widget on a display, the display region being non-overlapping with display regions of other widgets,
  rendering the multiple widgets based on the received user input on the display at display regions of the display corresponding to respective widget locations of the multiple widgets, the multiple widgets comprising a plurality of widgets of filtering type having widget code comprising one or more of an indication of widget type, a widget location, rendering data, executable code, and a filtering parameter, and a plurality of widgets of visualization type having widget code configured to visualize data on the display, the rendering for each of the plurality of widgets of visualization type comprising:
    executing, by the processor, a set of instructions to select a controlling widget of filtering type, wherein the controlling widget of the plurality of widgets of filtering type is controlling according to a control rule, said control rule depending on a widget location of the widget of visualization type and a widget location of the widget of filtering type at the display regions of the display,
      wherein the control rule determines a first widget of filtering type to be a controlling widget for a second widget of visualization type, the control rule comprising
        determining an overlap in the x-coordinates of the display region of the first widget and the x-coordinates of the display region of the second widget, and y-coordinates of the display region of the first widget that are at least as high or at least as low as y-coordinates of the display region of the second widget, determining an overlap in the y-coordinates of the display region of the first widget and the y-coordinates of the display region of the second widget, and x-coordinates of the display region of the first widget that are at least as high or at least as low as x-coordinates of the display region of the second widget, obtaining data from the database filtered according to the filtering parameter of the controlling widget, and visualizing the filtered data according to the widget code of the widget of visualization type at the display regions of the display.

12. A non-transitory computer readable medium comprising data representing instructions to cause a processor system to perform the method according to claim 11.

13. The method of claim 11, wherein rendering the multiple widgets on the display further comprises:

receiving a user input at the user input interface, changing a widget location and/or a display region of a widget according to the received user input, and rendering again said widget of the multiple widgets according to the changed widget location and/or display region, and rendering again widgets of visualization type having different controlling widgets due to the changed widget location and/or display region.

* * * * *